April 26, 1966 K. M. ROSE ETAL 3,247,706

LEAK TESTING OF NUCLEAR REACTOR FUEL ELEMENTS

Filed July 19, 1962

United States Patent Office 3,247,706
Patented Apr. 26, 1966

3,247,706
LEAK TESTING OF NUCLEAR REACTOR FUEL ELEMENTS
Kenneth Miles Rose and Charles Alan Mann, Lytham St. Annes, England, assignors to United Kingdom Atomic Energy Authority, London, England
Filed July 19, 1962, Ser. No. 210,911
Claims priority, application Great Britain, Aug. 1, 1961, 27,837/61
3 Claims. (Cl. 73—40.7)

This invention relates to a method of testing nuclear reactor fuel elements of the type comprising fissile fuel material enclosed in a protective sheath and is particularly concerned with a method for detection of the presence of defects allowing fluid leakage in the protective sheaths of such fuel elements.

In order to enable the detection of defects in the protective sheath of a nuclear reactor fuel element of the type described above, the sheath can be sealed in an atmosphere of helium so that the internal free space of the fuel element is filled with helium and defects allowing fluid leakage in the fuel element sheath can be detected by detection of leaking helium using a mass spectrometer. The normal mass spectrometer leak test procedure for the helium filled fuel element is to place it in a vacuum test chamber which is evacuated to a pressure of about 10 microns of mercury. The chamber is then isolated from the means of evacuation and is connected by way of a constriction to a mass spectrometer which is kept at a pressure below $10^{-2}$ microns of mercury by its own evacuation system. Helium leaking from a fuel element through defects in the protective sheath of the fuel element flows into the vacuum test chamber and thence into the mass spectrometer where it is detected.

The detection of defects allowing large leakage by this method is difficult because most of the helium escapes from the fuel element sheath while the vacuum test chamber is being evacuated prior to connection of the chamber with the mass spectrometer. Consequently most of the helium is removed from the chamber as it is evacuated and very little remains in the chamber for detection by the mass spectrometer.

It has also been found that where beryllium is used as the sheath material of the fuel element every fuel element gives rise to a high helium signal at the beginning of the test whether or not a defect allowing large leakage exists in the fuel element sheath. This high initial helium signal arises due to helium which is adsorbed on the surface of the metal being given off by desorption as the pressure of the surrounding air is reduced.

The high background helium signal due to outgassing of adsorbed helium at the beginning of the test has two effects on the sensitivity of the test. First, in the test procedure described above it will be seen that the vacuum chamber must be evacuated before the mass spectrometer can be connected to detect helium. If the fuel element has a defect allowing large leakage then the evacuation time of the chamber (about one minute) during which helium is leaking rapidly from the fuel element and is removed as the chamber is evacuated, imposes an upper limit on the size of a detectable defect. Most of the helium can leak from the fuel element during the time in which the chamber is being evacuated and the residual leaked helium in the chamber after evacuation may be insufficient to give a detectable signal against the high background signal due to helium desorbing from the surface of the fuel element sheath. In addition, where a defect allowing large leakage is present in the fuel element sheath, helium is lost by diffusion during the passage of the fuel element from the welding rig to the vacuum test chamber. Any delay in transit of the fuel element means loss of helium in addition to that lost by evacuation of the vacuum test chamber and reduces the maximum detectable leakage still further. If the leak test is to be applied with the greatest sensitivity fuel elements delayed in transit between the welding rig and the vacuum test chamber must be re-soaked in an atmosphere of helium before testing to refill any which might have large defects. Second, to enable small defects to be detected, the element must be first outgassed of the surface adsorbed helium for instance by holding in the evacuated vacuum chamber for a time sufficient to remove the background signal due to the surface adsorbed helium and this can take a considerable time.

According to the invention a method of leak testing a helium filled nuclear reactor fuel element comprises the steps of causing helium to enter the sheath of the fuel element by immersion of the fuel element in helium, sealing the sheath and transferring the fuel element to a chamber filled with a gas other than helium at a pressure such that if there is a leak in the fuel element sheath then helium can diffuse from the fuel element sheath through the leak into the chamber without desorption of helium from the surface of the fuel element sheath and finally testing the gas in the chamber for helium content without reducing the pressure of gas in the chamber below the pressure at which helium desorbs from the surface of the fuel element sheath.

It has been found that the pressure of gas in the chamber below which helium begins to significantly desorb from a beryllium sheathed fuel element is about 0.9 of an atmosphere absolute.

One method in accordance with the invention will now be described by way of example with reference to the accompanying drawings in which.

Figure 1:
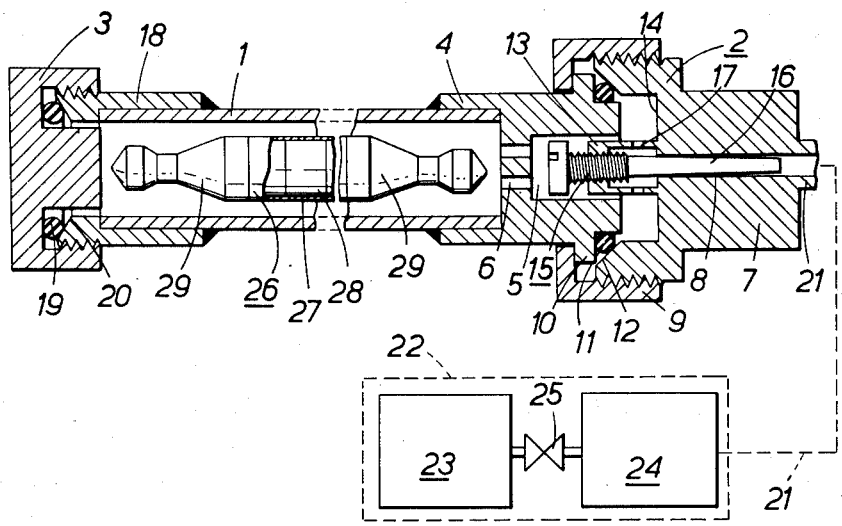
FIGURE 1 shows, in longitudinal section, apparatus for carrying out the method.

In FIGURE 1 there is shown a leak test chamber comprising a stainless steel tube 1 having one end closed by an adjustable leak throttle valve 2 and the other end closed by a vacuum tight sealing cap 3. The adjustable leak throttle valve 2 comprises an end adaptor 4 brazed to the end of the stainless steel tube 1 and having a blind bore 5 connected with the inside of the stainless steel tube 1 by vent holes 6. A brass fitting 7 having an accurately machined bore 8 is externally threaded to receive a clamping sleeve 9 which engages with an external flange 10 on the end adaptor 4. A sealing ring 11 is clamped between the flange 10 and a conical face 12 at the end of the brass fitting 7. A tubular projection 13 on the internal end face 14 of the brass fitting 7 is fitted with a threaded stainless steel pin 15. The stainless steel pin 15 has a conically tapered nose 16 which extends into the bore 8 of the brass fitting 7 and the tubular projection 13 has radial inlet drillings 17. The sealing cap 3 screws onto a tubular end adaptor 18 brazed to the stainless steel tube 1 at the opposite end to the adjustable leak throttle valve 2. The cap 3 is sealed by an O-ring 19 clamped against a conical sealing face 20 at the end of the tubular end adaptor 18.

The test chamber is connected by means of a tube 21 with a mass spectrometer leak detector 22 (shown in FIGURE 1 in schematic block outline). The mass spectrometer leak detector 22 comprises a mass spectrometer 23 and an auxiliary vacuum system 24 which connects with the mass spectrometer 23 through a valve 25. The tube 21 leads from the bore 8 of the adjustable leak 2 to the auxiliary vacuum system 24. A nuclear reactor fuel element 26 to be tested for leaks is shown inside the stainless steel tube 1. The fuel element 26 comprises a tubular beryllium sheath 27 containing right cylindrical pellets 28 of sintered uranium dioxide, the sheath 27 being closed at its ends by seam welded beryllium end plugs 29.

In use of the equipment the fuel element sheath 27 is sealed by the end plugs 29 in a helium filled welding chamber so that the internal free space in the sheath 27 of the fuel element 26 is filled with helium. The fuel element 26 is transferred with as little delay as possible from the helium filled welding chamber into the stainless steel tube 1 of the test chamber and the stainless steel tube 1 is sealed with the end cap 3. If delay occurs in the transfer of the fuel element 26 then it should be re-soaked in helium to ensure that if a defect allowing large leakage is present in the fuel element sheath 27 then the fuel element is refilled with helium. The auxiliary vacuum system 24 is evacuated to at least 20 microns of mercury, and the valve 25 is opened to connect the mass spectrometer 23 with the auxiliary vacuum system 24. The mass spectrometer 23 is kept at a significantly lower pressure, e.g. about $10^{-2}$ microns of mercury so that air leaking into the auxiliary vacuum system 24 through the adjustable leak throttle valve 2 from the stainless steel tube 1 of the test chamber will pass into the mass spectrometer 23. If the sheath 27 of the fuel element 26 has a defect allowing the air passing into the auxiliary vacuum system 24 through the adjustable throttle valve 2 will contain a proportion of helium which will be detected by the mass spectrometer 23 to give indication of the presence of the defect in the fuel element 26.

If no defect is present in the fuel element 26 the helium concentration in the tube 1 of the test chamber will be negligible as the helium adsorbed on the fuel element sheath 27 does not readily desorb in air at a pressure of about one atmosphere as it does in a vacuum. It has been found that the pressure of air in the tube 1 of the test chamber below which helium begins to significantly desorb from the fuel element sheath 27 is about 0.9 of an atmosphere absolute.

The adjustable leak throttle valve 2 must be of such a size as to prevent a leakage of air through the leak throttle valve 2 into the auxiliary vacuum system such that the pressure of air in the tube 1 of the test chamber falls below this value of 0.9 of an atmosphere during the test.

Rapid transfer of the fuel element 26 from the helium filled welding chamber to the test chamber ensures that large defects will be detected as the helium escape will occur mainly in the test chamber if the defect is not too large. The test however need not be carried out at once because even if the defect is large helium diffusing from the fuel element will be contained by the test chamber.

Because the helium adsorbed by the sheath 27 of the fuel element 26 does not readily desorb under the pressure of air at about one atmosphere in the test chamber then the presence of small defects is not masked by the background signal of helium normally present when the fuel element is subjected to a vacuum leak test.

Figure 2:
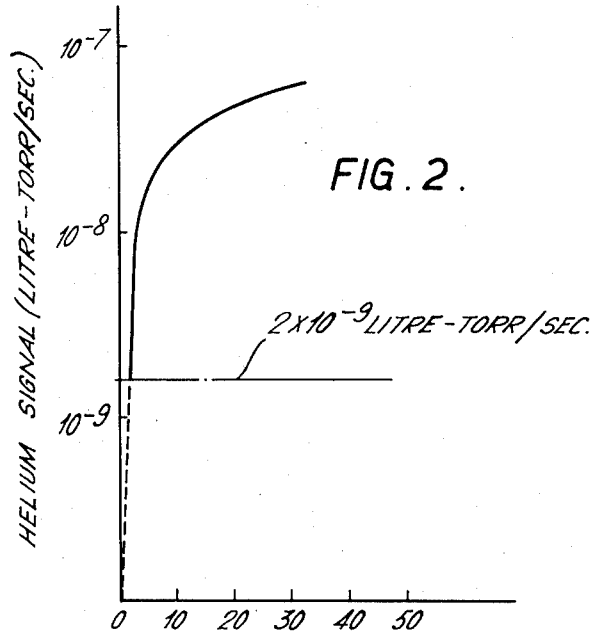
FIGURE 2 is a graph.

FIGURE 2 shows the helium signal curve received by the mass spectrometer 24 from a fuel element having a defect allowing leakage at a rate of 95 clusecs., the adjustable throttle valve 2 being adjusted to provide a leak rate of 1 clusec. A helium signal of $2 \times 10^{-9}$ litre-torr/sec. (i.e. about the smallest detectable by conventional mass spectrometer equipment) was reached about 2 minutes from the commencement of the test.

We claim:
1. A method of testing nuclear fuel elements of the type comprising fissile fuel material enclosed in a protective sheath, said method relating to the detection of defects allowing fluid leakage in the protective sheaths of such fuel elements and comprising the steps of causing helium to enter the protective sheath of the fuel element by immersion of the fuel element in helium, transferring the fuel element to a chamber filled with a gas other than helium at a pressure greater than the pressure below which helium desorbs from the fuel element sheath, and finally testing the gas from the chamber for helium content, gas being drawn off from the chamber, for testing, through a leak orifice of a size such that the gas in the chamber is maintained at a pressure such that helium can diffuse through defects in the sheath but greater than the pressure below which helium desorbs from the fuel element sheath.

2. A method of testing nuclear reactor fuel elements as claimed in claim 1 wherein a fuel element to be tested is immersed in helium after sealing the fuel element sheath and prior to transferring the fuel element to the chamber.

3. A method of testing nuclear reactor fuel elements as claimed in claim 1 wherein gas from the chamber is tested for helium content by means of a mass spectrometer.

References Cited by the Examiner

Oaks, A. E.: "Helium Testing Fuel Rods for the PWR Blanket," Nondestructive Testing, September-October 1960, pp. 319–322.

Kennedy, J. J.: "Gas Leak Detection," IBM Technical Disclosure Bulletin, vol. 5, No. 1, June 1962, page 19.

ISAAC LISANN, *Primary Examiner.*